(12) United States Patent
Diesen

(10) Patent No.: US 12,098,777 B2
(45) Date of Patent: Sep. 24, 2024

(54) LINEAR ELECTRIC ACTUATOR

(71) Applicant: National Oilwell Varco, L.P., Houston, TX (US)

(72) Inventor: Fredrik Diesen, Houston, TX (US)

(73) Assignee: National Oilwell Varco, L.P., Houston, TX (US)

( * ) Notice: Subject to any disclaimer, the term of this patent is extended or adjusted under 35 U.S.C. 154(b) by 402 days.

(21) Appl. No.: 17/637,601

(22) PCT Filed: Aug. 28, 2020

(86) PCT No.: PCT/US2020/048366
§ 371 (c)(1),
(2) Date: Feb. 23, 2022

(87) PCT Pub. No.: WO2021/041783
PCT Pub. Date: Mar. 4, 2021

(65) Prior Publication Data
US 2022/0275878 A1    Sep. 1, 2022

Related U.S. Application Data

(60) Provisional application No. 62/894,100, filed on Aug. 30, 2019.

(51) Int. Cl.
*F16K 31/04*     (2006.01)
*E21B 34/06*     (2006.01)
(Continued)

(52) U.S. Cl.
CPC ....... *F16K 31/048* (2013.01); *F16H 25/2204* (2013.01); *F16K 31/046* (2013.01);
(Continued)

(58) Field of Classification Search
CPC .......... E21B 34/066; F16H 2025/2081; F16H 25/2204; F16K 47/023; F16K 31/048;
(Continued)

(56) References Cited

U.S. PATENT DOCUMENTS 2,930,571 A * 3/1960 Vogl ...................... F16K 31/047
251/71
5,195,721 A * 3/1993 Akkerman .......... F16D 43/2024
192/81 C
(Continued)

OTHER PUBLICATIONS

International Search Report and Written Opinion dated Nov. 20, 2020, for Application No. PCT/US2020/048366.

*Primary Examiner* — William M McCalister
(74) *Attorney, Agent, or Firm* — Conley Rose, P.C.

(57) ABSTRACT

An actuator includes housing having a reciprocation axis, drive gear configured to couple to the motor, and electromagnetic clutch configured to couple to the motor and coupled to the drive gear. The clutch engages first and second clutch plates responsive to being powered and disengages the clutch plates responsive to not being powered. Actuator includes a ball screw including a nut and a threaded shaft. The nut is coupled to the drive gear and rotation of the drive gear induces rotation of the nut about the reciprocation axis. Rotation of the nut induces motion of the threaded shaft along the reciprocation axis. Actuator includes a fluid damper having a piston coupled to the threaded shaft and disposed within a chamber containing a fluid. Piston includes a port that couples a first chamber portion to a second chamber portion. A brake assembly limits rotation of the nut responsive to the assembly being engaged.

20 Claims, 6 Drawing Sheets

(51) Int. Cl.
*F16D 43/04* (2006.01)
*F16H 25/20* (2006.01)
*F16H 25/22* (2006.01)
*F16K 47/02* (2006.01)
*H02K 7/06* (2006.01)
*H02K 7/11* (2006.01)
*H02K 7/116* (2006.01)
*H02K 11/215* (2016.01)

(52) U.S. Cl.
CPC .............. *F16K 47/023* (2013.01); *H02K 7/06* (2013.01); *H02K 7/11* (2013.01); *H02K 7/116* (2013.01); *H02K 11/215* (2016.01); *E21B 34/066* (2013.01); *F16D 43/04* (2013.01); *F16H 2025/2081* (2013.01)

(58) Field of Classification Search
CPC ......... F16K 31/046; F16D 43/04; H02K 7/11; H02K 7/116; H02K 11/215
USPC ................................................... 251/129.13
See application file for complete search history.

(56) References Cited

U.S. PATENT DOCUMENTS

| | | | | |
|---|---|---|---|---|
| 5,518,462 | A * | 5/1996 | Yach | F16K 31/047 475/343 |
| 5,832,779 | A * | 11/1998 | Madrid | F16H 25/20 137/72 |
| 5,865,272 | A * | 2/1999 | Wiggins | F16K 31/047 74/89.31 |
| 6,488,260 | B1 * | 12/2002 | Dietz | F16K 31/047 464/30 |
| 7,615,893 | B2 * | 11/2009 | Biester | F16K 31/041 307/82 |
| 8,464,799 | B2 * | 6/2013 | Scott | E21B 34/16 166/373 |
| 10,197,141 | B2 * | 2/2019 | Armstrong | H01F 7/08 |
| 10,563,787 | B2 * | 2/2020 | Yates | F16K 31/046 |
| 2010/0308240 | A1 | 12/2010 | McAdoo et al. | |
| 2022/0275878 | A1 * | 9/2022 | Diesen | F16K 31/046 |

* cited by examiner

LINEAR ELECTRIC ACTUATOR

CROSS-REFERENCE TO RELATED APPLICATIONS

This application is a 35 U.S.C. § 371 national stage application of PCT/US2020/048366 filed on Aug. 28, 2020, entitled "Linear Electric Actuator", which claims benefit of U.S. provisional patent application No. 62/894,100 filed on Aug. 30, 2019, entitled "Linear Electric Actuator," both of which are incorporated herein in their entirety for all purposes.

STATEMENT REGARDING FEDERALLY SPONSORED RESEARCH OR DEVELOPMENT

Not applicable.

BACKGROUND

Electric actuators are used to control the movement of valves, for example to open and close the valves. Valves are located and configured to control a flow of liquid or gas (generally, a fluid) through a conduit. Valves are coupled to the conduit and include various forms of obstruction to block the fluid flow through the conduit that passes through the valve. The obstruction may be moveable to regulate and manage the amount of fluid that passes through the valve. Various obstructions may include a gate, a knife, a piston, or other blocking members, and may be powered by an electric actuator. One type of actuator is a linear actuator, which may be driven by an external motor assembly and an external gearbox assembly, and controlled by an external control system.

BRIEF SUMMARY OF THE DISCLOSURE

Examples of the present disclosure are directed to a valve actuator including an actuator housing having a reciprocation axis, a motor disposed within the actuator housing, a primary drive gear coupled to the motor, and an electromagnetic clutch coupled to the motor and the primary drive gear. The electromagnetic clutch has a first clutch plate and a second clutch plate. The electromagnetic clutch is configured to engage the first and second clutch plates responsive to the electromagnetic clutch being powered and disengage the first and second clutch plates responsive to the electromagnetic clutch not being powered. The valve actuator also includes a ball screw including a ball nut and a threaded shaft. The ball nut is coupled to the primary drive gear such that rotation of the primary drive gear induces rotation of the ball nut about the reciprocation axis. Rotation of the ball nut about the reciprocation axis is configured to induce linear motion of the threaded shaft along the reciprocation axis. The valve actuator further includes a fluid damper including a piston coupled to the threaded shaft and disposed within a chamber containing a fluid. The piston separates a first portion of the chamber from a second portion of the chamber. The piston has a port that fluidically couples the first portion to the second portion. The valve actuator also includes a brake assembly coupled to the ball nut and configured to limit rotation of the ball nut responsive to the brake assembly being engaged.

Other examples of the present disclosure are directed to a valve for controlling the flow of a fluid. The valve includes a valve housing including a flow passage, a gate configured to slide within the valve housing to control the flow of the fluid through the flow passage, and a valve actuator. The valve actuator includes an actuator housing having a reciprocation axis, a motor disposed within the actuator housing, a primary drive gear coupled to the motor, and an electromagnetic clutch coupled to the motor and the primary drive gear. The electromagnetic clutch has a first clutch plate and a second clutch plate. The electromagnetic clutch is configured to engage the first and second clutch plates responsive to the electromagnetic clutch being powered and disengage the first and second clutch plates responsive to the electromagnetic clutch not being powered. The valve actuator also includes a ball screw including a ball nut and a threaded shaft. The ball nut is coupled to the primary drive gear such that rotation of the primary drive gear induces rotation of the ball nut about the reciprocation axis. Rotation of the ball nut about the reciprocation axis is configured to induce linear motion of the threaded shaft along the reciprocation axis. The valve actuator further includes a fluid damper including a piston coupled to the threaded shaft and disposed within a chamber containing a fluid. The piston separates a first portion of the chamber from a second portion of the chamber. The piston has a port that fluidically couples the first portion to the second portion. The valve actuator also includes a brake assembly coupled to the ball nut and configured to limit rotation of the ball nut responsive to the brake assembly being engaged.

BRIEF DESCRIPTION OF THE DRAWINGS

For a detailed description of the preferred embodiments of the invention, reference will now be made to the accompanying drawings in which.

DETAILED DESCRIPTION

Figure 1:
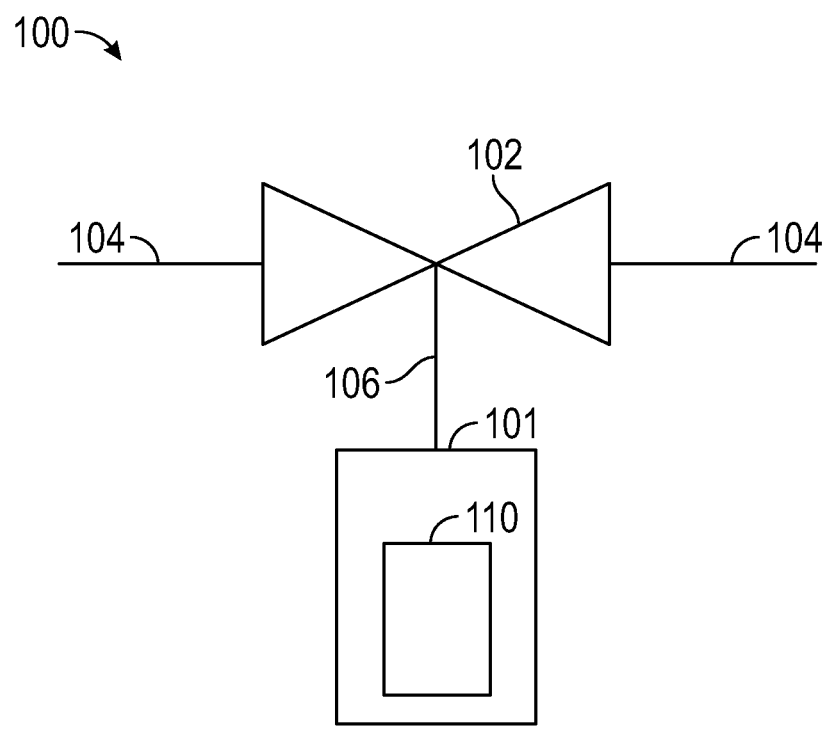
FIG. 1 is a schematic view of a valve and a corresponding linear valve actuator in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection.

Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims will be made for purposes of clarity, with "up", "upper", "upwardly" or "upstream" meaning toward the surface of the borehole and with "down", "lower", "downwardly" or "downstream" meaning toward the terminal end of the borehole, regardless of the borehole orientation.

Various industries, such as the oil and gas industry, use valves to control fluid flow through conduits and linear actuators to control valve obstructions, such as a gate in a gate valve. Certain valves are required to close in response to a lack of actuating force from an associated linear actuator; these valves are referred to as fail-close valves. Examples of fail-close valves include emergency shutdown valves (ESDs) that are used to shut-in a system during an uncontrolled well event. Other valves are required to open in response to a lack of actuating force from an associated linear actuator; these valves are referred to as fail-open valves. Examples of fail-open valves include valves in a bleed path that are used to vent pressure from a system. Embodiments of the linear electric actuators described herein are configured to actuate both fail-close valves and fail-open valves, and maintain the appropriate valve operation, either fail-close or fail-open, in the event of a loss of actuating force (e.g., a loss of electric power). For simplicity and consistency, reference throughout is generally made to fail-closed operation, but it should be appreciated that embodiments of the linear electric actuators described herein may be similarly utilized with a fail-open valve as well.

As previously described, linear actuators are commonly driven by an external motor and external gearbox assembly, and controlled by an external control system. As a result, while individual components are able to be certified to various standards (e.g., Atmosphere Explosible (ATEX) certification, Underwriter Laboratories (UL) certification, International Electrotechnical Commission System for Certification to Standards Relating to Equipment for Use in Explosive Atmospheres (IECEx System) certification), the combination of components is not itself able to be certified to such standards. Further, the need to assemble linear actuators in a piecemeal fashion is inefficient and introduces unnecessary complexity in the field.

These and other problems are addressed by the various embodiments described herein, which are directed to a linear valve actuator having an actuator housing that contains a motor that drives a ball screw through a drivetrain. In particular, the motor is coupled to a primary drive gear, which is in turn coupled to a ball nut of the ball screw. The ball nut is axially fixed, and thus rotation of the ball nut induces linear motion of a threaded shaft of the ball screw in a reciprocation axis. The threaded shaft of the ball screw is configured to couple to a valve stem to actuate a valve obstruction, such as a gate in a gate valve.

In some embodiments, the linear valve actuator also includes an electromagnetic clutch coupled to the motor and to the primary drive gear so that torque from the motor is transferred to the primary drive gear responsive to the electromagnetic clutch being engaged (e.g., responsive to power being provided to the electromagnetic clutch). However, responsive to the electromagnetic clutch being disengaged (e.g., responsive to power not being provided to the electromagnetic clutch), the primary drive gear is permitted to freewheel to permit fail-close (or fail-open) operation of a valve actuated by the linear valve actuator. In some embodiments, the linear valve actuator also includes a fluid damper in which a piston is coupled to the threaded shaft and disposed within a fluid-filled chamber. The piston thus separates a first portion of the chamber from a second portion of the chamber, and includes a port that fluidically coupled the first portion to the second portion. In some embodiments, the linear valve actuator also includes a brake assembly that, responsive to being engaged, limits the rotation of the primary drive gear or the ball nut itself, which in turn limits the translation of the threaded shaft. Engagement of the brake assembly may be achieved by, for example, an electric solenoid, which limits movement of the threaded shaft (e.g., to hold open a fail-close valve) while consuming less power than using the motor to achieve the same outcome.

Embodiments described herein are also directed to valves for controlling the flow of a fluid, which are actuated by the described linear valve actuator. These and other details are described more fully below.

Referring now to FIG. 1, a system 100 is shown that includes a linear actuator 101 coupled to a valve 102. The valve 102 is coupled to a conduit 104 and is configured to control a flow of fluid through the conduit 104. The valve 102 is operated by the linear actuator 101. In one example, the valve 102 is a gate valve including a valve stem 106. The valve stem 106 is configured to couple to a shaft of the linear actuator 101, such that linear movement of the shaft (e.g., reciprocation) induces a corresponding motion of the valve stem 106, which in turn operates a gate of the valve 102 to regulate flow through the conduit 104. A control system 110 is also coupled to, or included in, the linear actuator 101 to control various aspects of the linear actuator 101. The control system 110 functionality is described in further detail below.

As explained above, conventionally, the linear actuator 101 is driven by an external motor and external gearbox assembly, and controlled by an external control system. However, the need to assemble the linear actuator 101 in a piecemeal fashion is inefficient and introduces unnecessary complexity in the field, and prevents the combination of components to be certified to various standards.

Figure 2A:
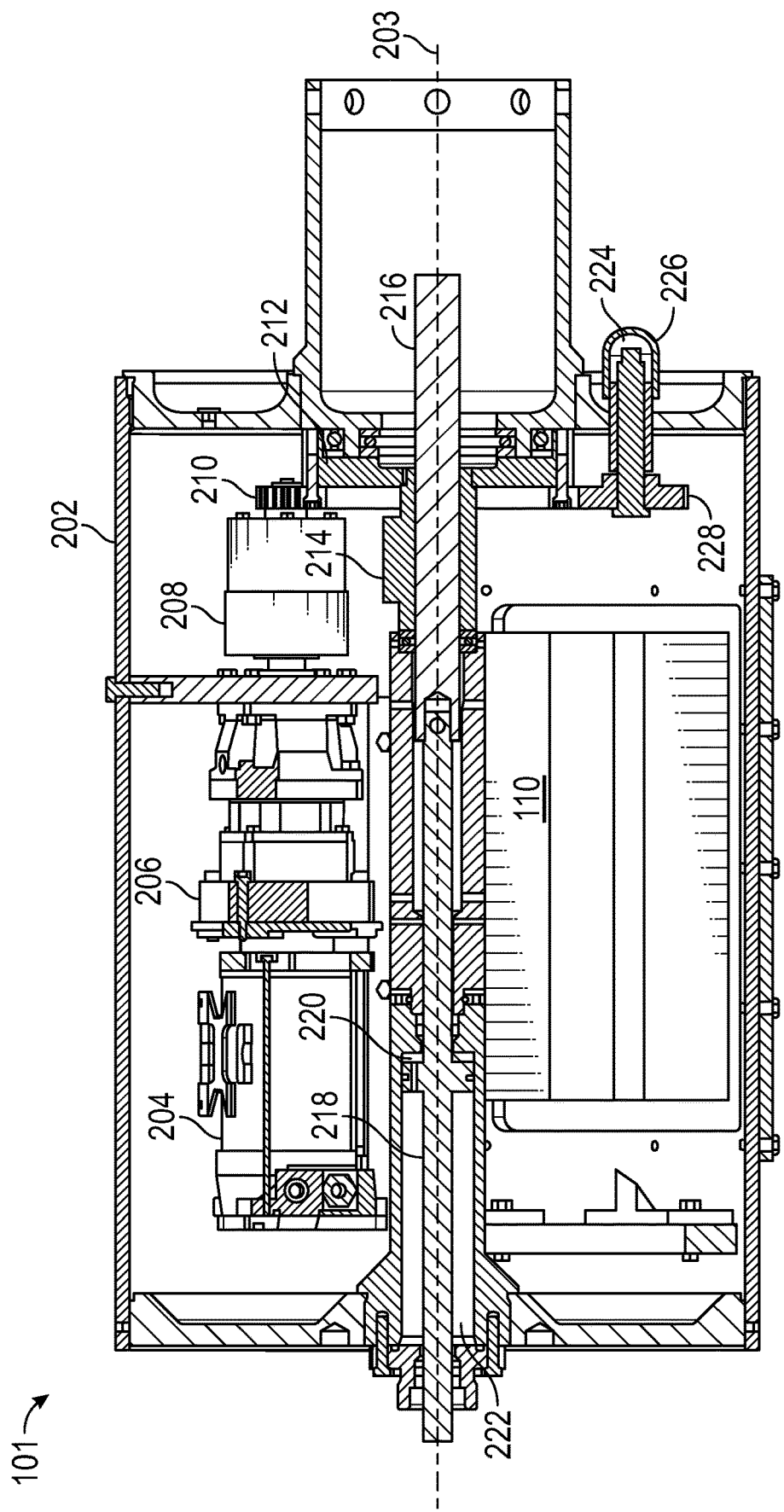
FIGS. 2A-2D are varying cross-sectional views of the linear valve actuator in accordance with the principles described herein.

FIG. 2A shows a cutaway view of the linear actuator 101 in accordance with embodiments of this disclosure. In particular, the linear actuator 101 includes an actuator housing 202, which contains the various components of the linear actuator 101. As a result, and as will be explained in further detail below, the linear actuator 101 described herein is self-contained, and thus the entirety of the linear actuator 101 is able to be certified to various certification standards (e.g., ATEX, UL, and IECEx System certification standards). Additionally, the linear actuator 101 described herein offers numerous other improvements over conventional actuators.

The actuator housing 202 has a reciprocation axis denoted as 203 and, as will be explained further below, a shaft of the linear actuator 101 translates along this reciprocation axis 203 to operate the valve stem 106 to control fluid flow through the valve 102. The actuator housing 202 includes an electric motor 204, which may be any type of electric motor, such as a direct current (DC) motor or an alternating current (AC) motor. The motor 204 includes an output shaft, not shown for simplicity, which is operatively coupled to a planetary gearbox 206. The planetary gearbox 206 is configured to reduce a rotational speed of the output shaft of the motor 204 and to multiply a torque provided by the output shaft of the motor 204.

The planetary gearbox 206 also includes an output shaft, not shown for simplicity, which is operatively coupled to a torque limiter 208. The torque limiter 208 is configured to limit the amount of torque provided from the motor 204 and the planetary gearbox 206 to the remaining components of the linear actuator 101. In particular, as the shaft of the linear actuator 101 reaches the end of its travel along reciprocation axis 203, the torque from the motor 204 and planetary gearbox 206 may increase, or spike, to a value that is greater than the tolerance of certain components of the linear actuator 101. The torque limiter 208 effectively limits the torque provided to those components. The torque limiter 208 may include, for example, a friction plate slip-clutch. However, the scope of this disclosure is not limited to a particular type of torque limiter 208.

Although depicted as separate components, certain embodiments may combine the functionality of more than one of the motor 204, the planetary gearbox 206, and the torque limiter 208 into a single component. Additionally, certain other embodiments may omit one or more of the planetary gearbox 206 and the torque limiter 208, for example where the motor 204 is designed to be a direct drive motor and is not at risk of generating a torque greater than the tolerance of certain components of the linear actuator 101. Further, although the motor 204, planetary gearbox 206, and torque limiter 208 are shown in FIG. 2A in a certain order, other embodiments are within the scope of this disclosure in which the motor 204, planetary gearbox 206, and torque limiter are arranged in an order different than that shown in FIG. 2A.

The motor 204 is coupled to a primary drive gear 210. In the example of FIG. 2A, the coupling is through the planetary gearbox 206 and the torque limiter 208, described above. However, in another example, the motor 204 is a direct drive motor having its output shaft directly coupled to the primary drive gear 210.

The linear actuator 101 also includes a ball screw, which is composed of a ball nut 214 and a threaded shaft 216. The ball nut 214 is configured to rotate about the reciprocation axis 203, which induces translation of the threaded shaft 216 along the reciprocation axis 203. Although not shown in FIG. 2A, the threaded shaft 216 is configured to couple to the valve stem 106, such that linear movement of the threaded shaft 216 (e.g., along the reciprocation axis 203) induces a corresponding motion of the valve stem 106, which in turn operates a gate of the valve 102 to regulate flow through the conduit 104. The primary drive gear 210 is coupled to the ball nut 214 by way of a ball nut gear 212, which may be integrated with the body of the ball nut 214 itself, or otherwise coupled to the body of the ball nut 214. Thus, rotation of the primary drive gear 210 induces a corresponding rotation of the ball nut 214, which in turn induces linear motion of the threaded shaft 216 in the reciprocation axis 203.

The linear actuator 101 also includes a fluid damper, which is composed of a piston 218 that is coupled to the threaded shaft 216. In this example, the piston 218 is coaxial with the threaded shaft 216. However, in other examples the piston 218 may be radially offset from the threaded shaft 216. The piston 218 is disposed in a chamber 222, which is filled with a fluid. The piston 218 thus separates the chamber 222 into a first portion and a second portion. The piston 218 includes a port 220 that fluidically couples the first portion of the chamber 222 to the second portion of the chamber 222. In a fail-close scenario, pressure in the valve 102 causes the valve stem 106 to exert a force on the threaded shaft 216, which may cause the threaded shaft 216 to translate along the reciprocation axis 203 with an undesirably high velocity, which could lead to the damage or premature weakening of one or more components of the linear actuator 101. The fluid damper provides resistance to reduce the translation velocity of the threaded shaft 216 in such a scenario. In particular, a type of the fluid having certain fluid properties (e.g., viscosity) in the chamber 222 and a geometry (e.g., diameter, profile, or both) of the port 222 may be selected to provide a desired amount of resistance so that movement of the threaded shaft 216 in the reciprocation axis 203 does not exceed a particular velocity in response to a force applied to the threaded shaft 216 by the valve stem 106.

In some examples, the linear actuator 101 also includes an auxiliary drive shaft 224 coupled to an auxiliary drive gear 228 (e.g., an auxiliary drivetrain). The auxiliary drive shaft 224 is accessible from the exterior of the actuator housing 202, and thus a protective cover 226 is provided for the auxiliary drive shaft 224, for example to protect the auxiliary drive shaft 224 from corrosion. The auxiliary drive gear 228 also is coupled to the ball nut 214 by way of the ball nut gear 212. Thus, rotation of the auxiliary drive gear 228 induces a corresponding rotation of the ball nut 214, which in turn induces linear motion of the threaded shaft 216 in the reciprocation axis 203. Additionally then, the protective cover 226 functions to protect personnel from moving equipment, since the auxiliary drive shaft 224 will also rotate during normal operation (e.g., using the primary drive gear 210 to rotate the ball nut 214).

The auxiliary drivetrain 224, 228 facilitates actuation of the valve 102 even in situations such as a power loss where the motor 204 is not functional. For example, although the linear actuator 101 permits fail-close operation of the valve 102, in certain situations it may be desired to open the valve 102 even though power is not available and thus the motor 204 is not functional. In such a situation, the auxiliary drive shaft 224 may be accessed from the exterior of the actuator housing 202 (e.g., with a hand tool or a power tool). Then, responsive to being rotated, the auxiliary drive shaft 224 through the auxiliary drive gear 228 induces rotation of the ball nut 214, and thus induces linear motion of the threaded shaft 216 in the reciprocation axis 203, actuating the valve 102 via the valve stem 106 coupled to the threaded shaft 216. In certain examples, once the auxiliary drivetrain 224, 228 is used to open a fail-close valve or to close a fail-open valve, the valve 102 may be locked in that position using a fusible or non-fusible cap disposed on the actuator housing 202 and coupled to the threaded shaft 216 to prevent additional movement of the threaded shaft 216.

Figure 2B:
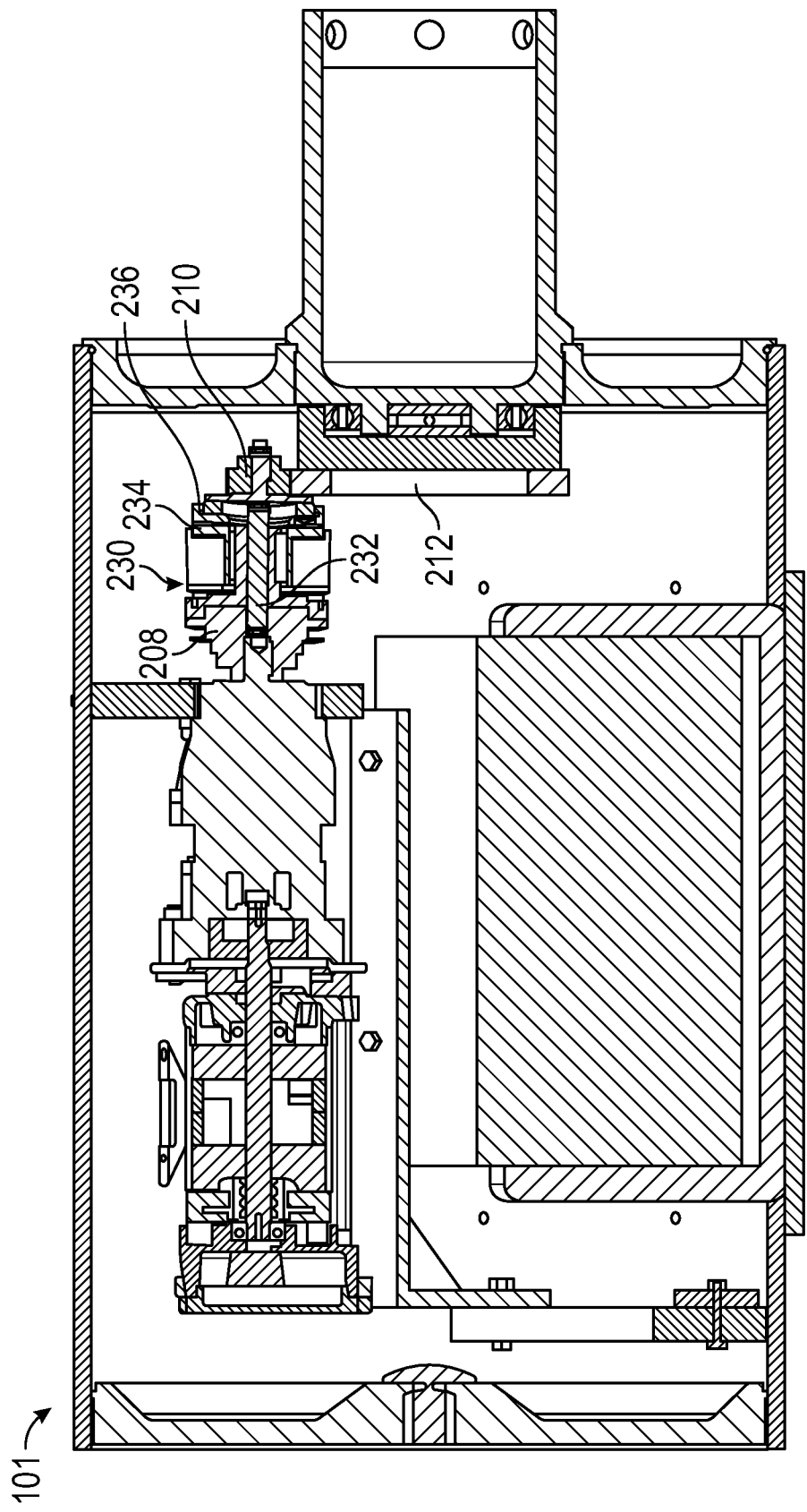

Turning now to FIG. 2B, another cutaway view of the linear actuator 101 is shown that shows additional detail of the torque limiter 208 in accordance with embodiments of this disclosure. In this example, the torque limiter 208 also includes an electromagnetic clutch 230 that is coupled to the motor 204 (e.g., by way of the planetary gearbox 206). The electromagnetic clutch 230 is also coupled to the primary drive gear 210. Responsive to being in an engaged state, the electromagnetic clutch 230 is configured to transfer torque from the motor 204 to the primary drive gear 210 when the electromagnetic clutch 230 is engaged. In particular, the electromagnetic clutch 230 includes a clutch rotor shaft 232 that is coupled to a first clutch plate 234. Thus, torque applied to the rotor shaft 232 by the torque limiter 208 causes the rotor shaft 232 to rotate and the first clutch plate 234 rotates along with the clutch rotor shaft 232. The electromagnetic clutch 230 also includes a second clutch plate 236 that is coupled to, and thus rotates along with, the primary drive gear 210. Responsive to power being supplied to the linear actuator 101, the electromagnetic clutch 230 is configured to cause the first clutch plate 234 and the second clutch plate 236 to engage such that rotation of the first clutch plate 234 induces a corresponding rotation of the second clutch plate 236. However, responsive to power not being supplied to the linear actuator 101, the electromagnetic clutch 230 is configured to cause the first clutch plate 234 and the second clutch plate 236 to disengage such that the first clutch plate 234 does not induce a corresponding rotation of the second clutch plate 236 (e.g., the first clutch plate 234 rotates freely of the second clutch plate 236).

In a first example, the valve 102 is a fail-close valve, the electromagnetic clutch 230 is engaged (e.g., responsive to power being supplied to the linear actuator 101), and transfers torque from the motor 204 to the primary drive gear 210. In this example, responsive to the primary drive gear 210 rotating, the primary drive gear 210 and the ball nut 214 induce translation of the threaded shaft 216 that corresponds to opening the valve 102. That is, when engaged, the electromagnetic clutch 230 facilitates torque transfer from the motor 204 to the primary drive gear 210 (e.g., through the planetary gearbox 206 and the torque limiter 208) to actuate the valve 102 to the opposite of its fail state, or to open the valve 102 in the case where the valve 102 is a fail-close valve. However, in order to facilitate proper fail-close operation of the valve 102, the electromagnetic clutch 230 is also configured to disengage (e.g., decouple the primary drive gear 210 from the motor 204) responsive to power not being supplied to the linear actuator 101. During fail-close operation, pressure in the valve 102 body exerts a force on the threaded shaft 216 through the valve stem 106. As a result of the electromagnetic clutch 230 being disengaged, the primary drive gear 210 is able to freewheel in the case where the motor 204 is not functional or otherwise applying torque to actuate the valve 102 to the open position, in order to permit fail-close operation of the valve 102 actuated by the linear actuator 101.

Figure 2C:
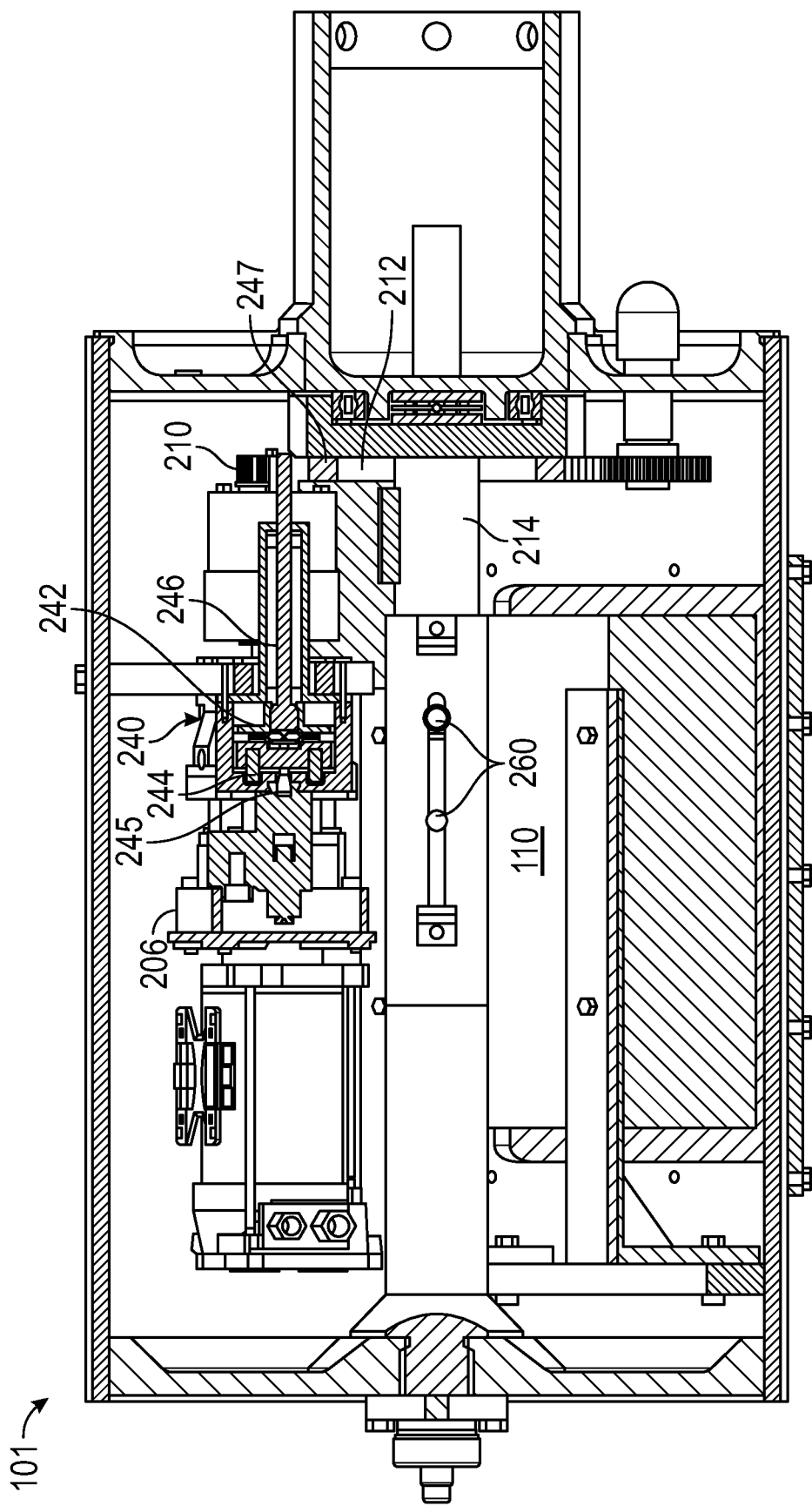

Turning now to FIG. 2C, another cutaway view of the linear actuator 101 is shown that shows additional detail of a brake assembly 240 coupled to the planetary gearbox 206 in accordance with embodiments of this disclosure. In this example, the brake assembly 240 is radially offset from the remainder of the drivetrain (e.g., the motor 204, the planetary gearbox 206, the torque limiter 208, and the primary drive gear 210) and is coupled to a braking gear 247. The braking gear 247 is also coupled to the ball nut 214 by way of the ball nut gear 212. The brake assembly 240 is configured to limit rotation of the braking gear 247 responsive to the brake assembly 240 being engaged. The brake assembly 240 includes a rotor 242 that is coupled to a shaft 246 that couples to the braking gear 247. The rotor 242 rotates along with the shaft 246, for example responsive to the motor 204 driving the primary drive gear 210 (and thus the ball nut gear 212) to actuate the valve 102. The brake assembly 240 also includes a stator 244 that is coupled to a housing of the brake assembly 240, and thus does not rotate. The brake assembly 240 also includes a solenoid 245 that is configured to urge or bias the stator 244 into contact with the rotor 242 to provide braking and prevent the rotor 242, and thus the braking gear 210 (and the ball nut gear 212) coupled to the shaft 246, from rotating.

In one example, mating surfaces of the rotor 242 and the stator 244 are profiled to further prevent rotation of the rotor 242 responsive to the stator 244 being biased into contact with the rotor 242. As will be explained in further detail below, the profile of the mating surfaces may include protrusions having engaging faces, which are angled relative to a normal of the mating surface, which oppose rotation in both directions, and facilitates the physical separation of the rotor 242 and the stator 244 in response to rotation as a result of the solenoid 245 not being powered, or otherwise urging the stator 244 into contact with the rotor 242 (e.g., to release the brake assembly 240 in the absence of power to facilitate fail-close operation of the valve 102). The mating surfaces of the rotor 242 and the stator 244 are explained in further detail below. Actuating the brake assembly 240 using the solenoid 245, which limits movement of the braking gear 247 and thus the ball nut gear 212 and threaded shaft 216 (e.g., to hold open a fail-close valve 102), consumes less power than using the motor 204 torque to hold open the fail-close valve 102.

In another example, the brake assembly 240 is co-axial with the remainder of the drivetrain (e.g., the motor 204, the planetary gearbox 206, the torque limiter 208, and the primary drive gear 210) and the shaft 246 is coupled to the primary drive gear 210 (e.g., by way of the torque limiter 208) and to the motor 204 (e.g., by way of the planetary gearbox 206). For example, an output shaft of the planetary gearbox 206 may pass through the center of the stator 244 and couple to the rotor 242 and the shaft 246. In this example then, the brake assembly 240 is configured to limit rotation of the primary drive gear 210 responsive to the brake assembly 240 being engaged.

Figure 2D:
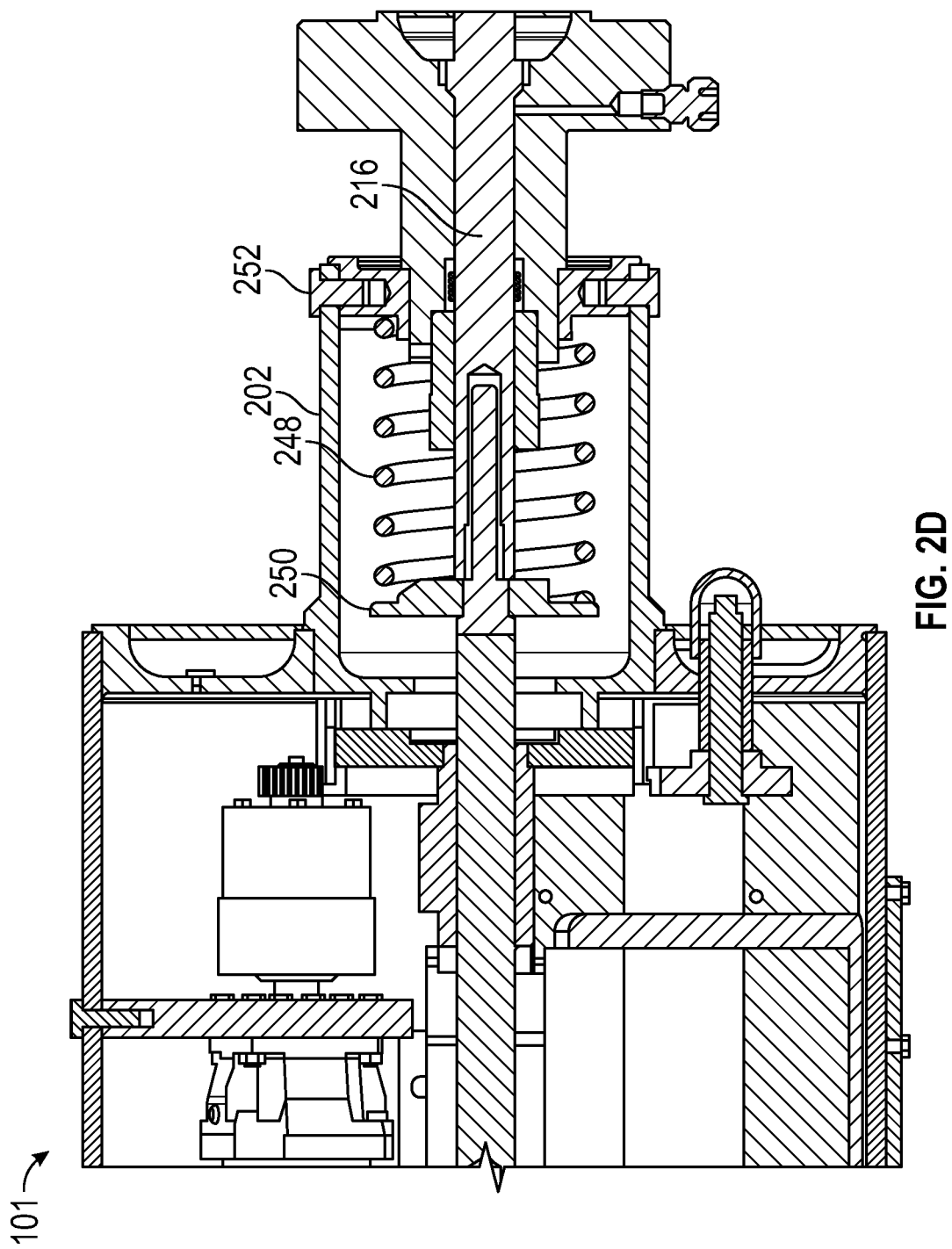

Turning now to FIG. 2D, another cutaway view of the linear actuator 101 is shown that shows additional detail of a spring 248 coupled to the threaded shaft 216 in accordance with embodiments of this disclosure. In this example, a first spring seat 250 is coupled to the threaded shaft 216 while a second spring seat 252 is coupled to the actuator housing 202. The spring 248 is disposed between the first and second spring seats 250, 252 and is configured to bias the first spring seat 250 away from the second spring seat 252. In an example where the valve 102 is a fail-close valve, in the event of a loss of power to the linear actuator 101 (e.g., the motor 204), if there is pressure in the valve 102 body, a force is exerted on the valve stem 106 in order to close the valve 102. Since the threaded shaft 216 is coupled to the valve stem 106, a force is also exerted on the threaded shaft 216, which is permitted to move in response to such force because of the electromagnetic clutch 230 disengaging due to the loss of power to the linear actuator 101, explained above. However, if there is no pressure in the valve 102 body, or an insufficiently-high pressure in the valve 102 body, no such force is exerted on the valve stem 106, nor the threaded shaft 216. In the absence of such force, the spring 250 biases the threaded shaft (to the left, as shown), which corresponds to closing the valve 102. Thus, regardless of whether there is pressure in the valve 102 body, fail-close operation is facilitated.

Referring back to FIG. 2C, the linear actuator 101 also includes one or more position sensors 260 coupled to the threaded shaft 216. The position sensors 260 may be, for example, magnetic position sensors configured to generate (and/or sense) a magnetic field that is measurable to determine a position of the threaded shaft 216 in the actuator housing 202. The linear actuator 101 also includes the control system 110, briefly described with respect to FIG. 1, above. The control system 110 is configured to control the operation of the motor 204, such as whether the motor 204 is on or off, and in some cases a speed of the motor 204. The control system 110 may receive control inputs locally or manually (e.g., from user input on one or more buttons on the actuator housing 202) or remotely (e.g., from a computer located away from but communicatively coupled to the linear actuator 101.

In addition to controlling the motor 204 operation, the control system 110 also controls the brake assembly 240 by controlling the solenoid 245 to cause the stator 244 to engage the rotor 242 (e.g., to provide braking force and limit the rotation of the braking gear 247 (or the primary drive gear 210) and corresponding motion of the threaded shaft 216). The control system 110 receives an input, for example from a user, that indicates a desired position of the threaded shaft 110. In response to receiving such an input, the control system 110 operates the motor 204 to drive the primary drive gear 210, inducing movement of the threaded shaft 216 along the reciprocation axis 203. Once the control system 110 receives an indication from the position sensor(s) 260 that the threaded shaft 216 has reached the desired position, the control system 110 causes the solenoid 245 to urge the stator 244 into contact with the rotor 242, braking the braking gear 247 (or the primary drive gear 210) and limiting motion of the threaded shaft 216. At the same time, the control system 110 may cause the motor 204 to stop running, reducing power consumption of the linear actuator 101 while maintaining an appropriate valve 102 position.

Figure 3:
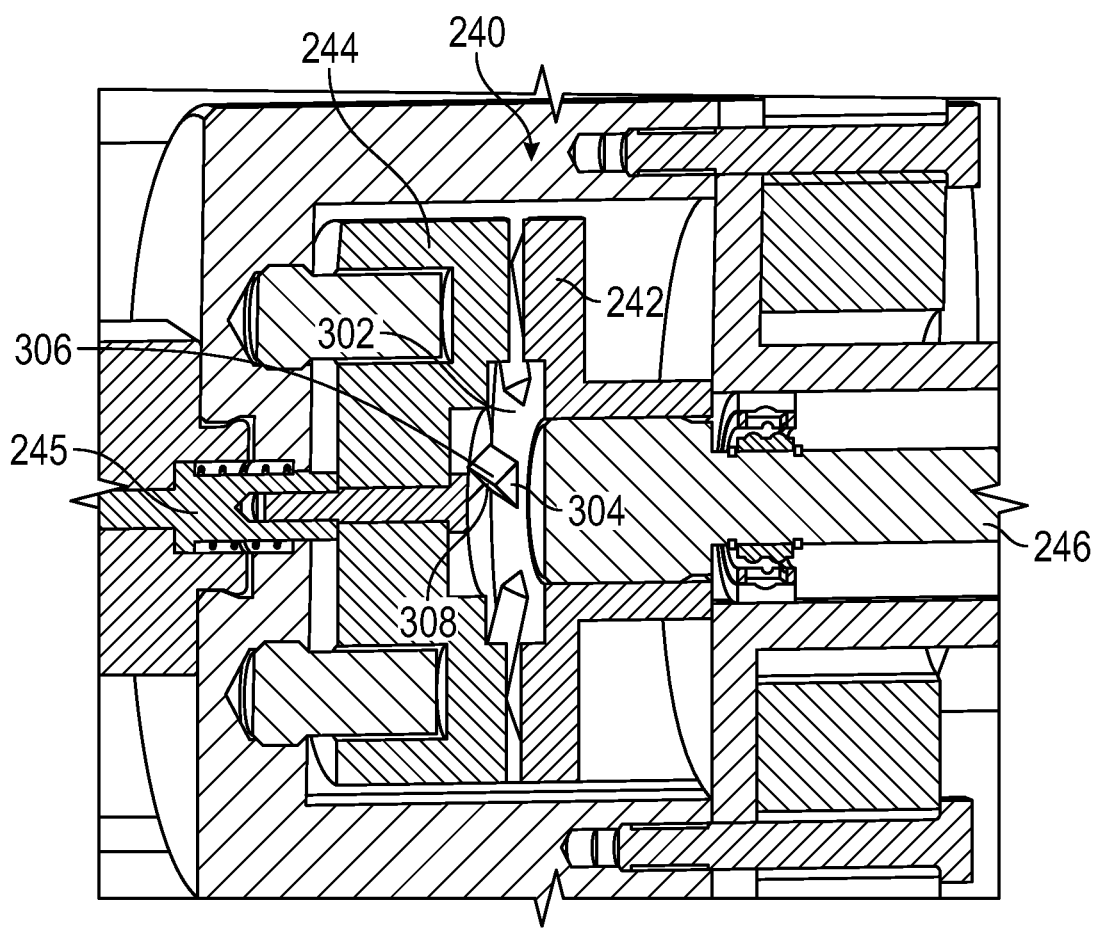
FIG. 3 is a perspective view of a brake assembly of the linear valve actuator in accordance with the principles described herein.

FIG. 3 shows a cutaway, perspective view of the brake assembly 240 in further detail. In particular, a mating surface 302 of the rotor 242 is shown. It should be appreciated that the stator 244 includes a similar mating surface, which is not depicted due to the perspective nature of FIG. 3. The mating surface 302 (and that of the stator 244) includes one or more radially extending protrusions 304 that limit rotation of the rotor 242 responsive to the solenoid 245 urging the mating surface of the stator 244 into contact with the mating surface 302. In the example of FIG. 3, the protrusions 302 include a first engaging face 306 and a second engaging face 308, both of which are angled relative to a normal of the mating surface 302. As a result of being so angled, rather than the engaging faces 306, 308 being normal to the mating surface 302, for example, responsive to the solenoid 245 not being powered, or otherwise urging the stator 244 into contact with the rotor 242, the rotation of the rotor 242 relative to the stator 244 results in their becoming physically separated. Thus, in the example where the valve 102 is a fail-close valve, responsive to the solenoid 245 not being powered, the brake assembly 240 disengages as a result of rotation of the rotor 242, facilitating fail-close operation of the valve 102 as the primary drive gear 210 and the shaft 246 are allowed to freewheel.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. As another example, valves have generally been described as being of the fail-close type, in which an actuation force is needed to move the valve to an open position and, in the absence of such actuation force, the valve is designed to move to a closed position. However, linear actuators of this disclosure are equally applicable to fail-open valves, in which an actuation force is needed to move the valve to a closed position and, in the absence of such actuation force, the valve is designed to move to an open position. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A valve actuator, comprising:
   an actuator housing having a reciprocation axis;
   a primary drive gear configured to couple to a motor;
   an electromagnetic clutch configured to couple to the motor and coupled to the primary drive gear, the electromagnetic clutch having a first clutch plate and a second clutch plate, the electromagnetic clutch configured to:
      engage the first and second clutch plates responsive to the electromagnetic clutch being powered; and
      disengage the first and second clutch plates responsive to the electromagnetic clutch not being powered;
   a ball screw comprising a ball nut and a threaded shaft, wherein the ball nut is coupled to the primary drive gear such that rotation of the primary drive gear induces rotation of the ball nut about the reciprocation axis, wherein rotation of the ball nut about the reciprocation axis is configured to induce linear motion of the threaded shaft along the reciprocation axis;
   a fluid damper comprising a piston coupled to the threaded shaft and disposed within a chamber containing a fluid, the piston separating a first portion of the chamber from a second portion of the chamber, wherein the piston comprises a port that fluidically couples the first portion to the second portion; and
   a brake assembly coupled to the ball nut and configured to limit rotation of the ball nut responsive to the brake assembly being engaged.

2. The valve actuator of claim 1, further comprising a planetary gearbox configured to couple to the motor and coupled to the primary drive gear.

3. The valve actuator of claim 2, further comprising a torque limiter coupled to the planetary gearbox and to the primary drive gear, the torque limiter configured to limit an amount of torque provided by the planetary gearbox to the primary drive gear.

4. The valve actuator of claim 1, further comprising:
   an auxiliary drive shaft configured to be accessed from an external surface of the actuator housing; and
   an auxiliary drive gear coupled to the auxiliary drive shaft and to the ball nut such that rotation of the auxiliary drive gear induces rotation of the ball nut, which in turn induces linear motion of the shaft in the reciprocation axis.

5. The valve actuator of claim 4, wherein the auxiliary drive shaft is parallel to and radially offset from the threaded shaft.

6. The valve actuator of claim 1, further comprising a spring configured to bias the threaded shaft along the reciprocation axis.

7. The valve actuator of claim 1, wherein the primary drive gear, the fluid damper, and the brake assembly are contained within the actuator housing.

8. The valve actuator of claim 1, further comprising:
a position sensor coupled to the threaded shaft; and
a control system coupled to the position sensor and configured to:
receive an input indicating a desired position of the threaded shaft;
cause the motor to drive the primary drive gear and the ball nut to move the threaded shaft to the desired position; and
upon receiving an indication from the position sensor the threaded shaft is in the desired position, cause the brake assembly to engage.

9. The valve actuator of claim 1, wherein the brake assembly further comprises:
a rotor coupled to a braking gear that is coupled to the ball nut;
a stator coupled to a brake assembly housing; and
a solenoid coupled to the stator and configured to urge the stator into physical contact with the rotor.

10. The valve actuator of claim 9, wherein each of the rotor and stator comprises:
a mating surface; and
one or more protrusions coupled to the mating surface, wherein the protrusions comprise at least one engaging face angled relative to a normal of the mating surface.

11. A valve for controlling the flow of a fluid, the valve comprising:
a valve housing including a flow passage;
a gate configured to slide within the valve housing to control the flow of the fluid through the flow passage; and
a valve actuator, comprising:
an actuator housing having a reciprocation axis;
a primary drive gear configured to couple to a motor;
an electromagnetic clutch configured to couple to the motor and coupled to the primary drive gear, the electromagnetic clutch having a first clutch plate and a second clutch plate, the electromagnetic clutch configured to:
engage the first and second clutch plates responsive to the electromagnetic clutch being powered; and
disengage the first and second clutch plates responsive to the electromagnetic clutch not being powered;
a ball screw comprising a ball nut and a threaded shaft, wherein the ball nut is coupled to the primary drive gear such that rotation of the primary drive gear induces rotation of the ball nut about the reciprocation axis, wherein rotation of the ball nut about the reciprocation axis is configured to induce linear motion of the threaded shaft along the reciprocation axis, and wherein the threaded shaft is coupled to the gate;
a fluid damper comprising a piston coupled to the threaded shaft and disposed within a chamber containing a fluid, the piston separating a first portion of the chamber from a second portion of the chamber, wherein the piston comprises a port that fluidically couples the first portion to the second portion; and
a brake assembly coupled to the ball nut and configured to limit rotation of the ball nut responsive to the brake assembly being engaged.

12. The valve of claim 11, wherein the valve actuator further comprises a planetary gearbox configured to couple to the motor and coupled to the primary drive gear.

13. The valve of claim 12, wherein the valve actuator further comprises a torque limiter coupled to the planetary gearbox and to the primary drive gear and configured to limit an amount of torque provided by the planetary gearbox to the primary drive gear.

14. The valve of claim 11, wherein the valve actuator further comprises:
an auxiliary drive shaft configured to be accessed from an external surface of the actuator housing; and
an auxiliary drive gear coupled to the auxiliary drive shaft and to the ball nut such that rotation of the auxiliary drive gear induces rotation of the ball nut, which in turn induces linear motion of the shaft in the reciprocation axis.

15. The valve of claim 14, wherein the auxiliary drive shaft is parallel to and radially offset from the threaded shaft.

16. The valve of claim 11, wherein the valve actuator further comprises a spring configured to bias the threaded shaft along the reciprocation axis.

17. The valve of claim 11, wherein the motor, the primary drive gear, the fluid damper, and the brake assembly are contained within the actuator housing.

18. The valve of claim 11, wherein the valve actuator further comprises:
a position sensor coupled to the threaded shaft; and
a control system coupled to the position sensor and configured to:
receive an input indicating a desired position of the threaded shaft;
cause the motor to drive the primary drive gear and the ball nut to move the threaded shaft to the desired position; and
upon receiving an indication from the position sensor the threaded shaft is in the desired position, cause the brake assembly to engage.

19. The valve of claim 11, wherein the brake assembly further comprises:
a rotor coupled to a braking gear that is coupled to the ball nut;
a stator coupled to a brake assembly housing; and
a solenoid coupled to the stator and configured to urge the stator into physical contact with the rotor.

20. The valve actuator of claim 19, wherein each of the rotor and stator comprises:
a mating surface; and
one or more protrusions coupled to the mating surface, wherein the protrusions comprise at least one engaging face angled relative to a normal of the mating surface.

* * * * *